Patented Dec. 1, 1936

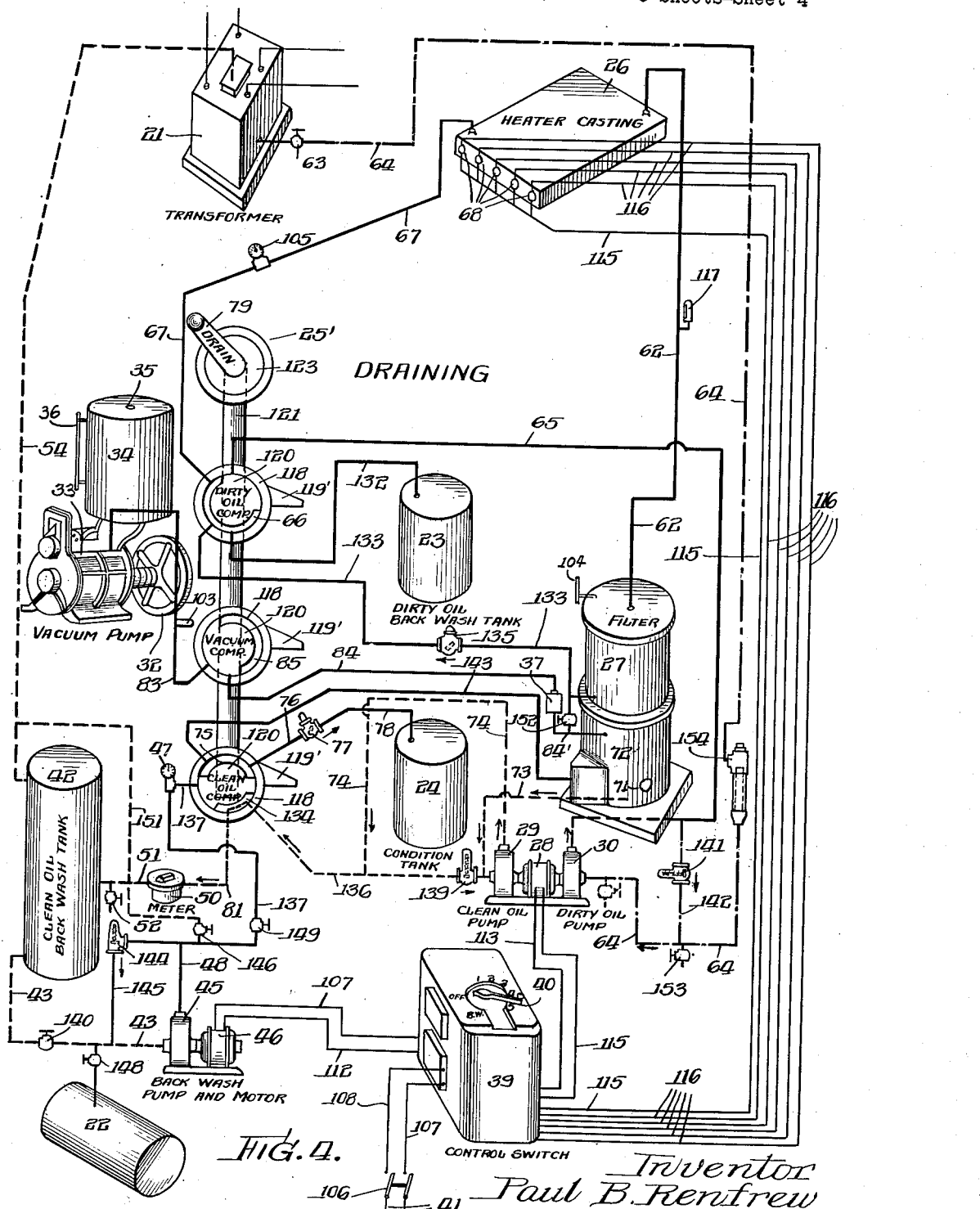

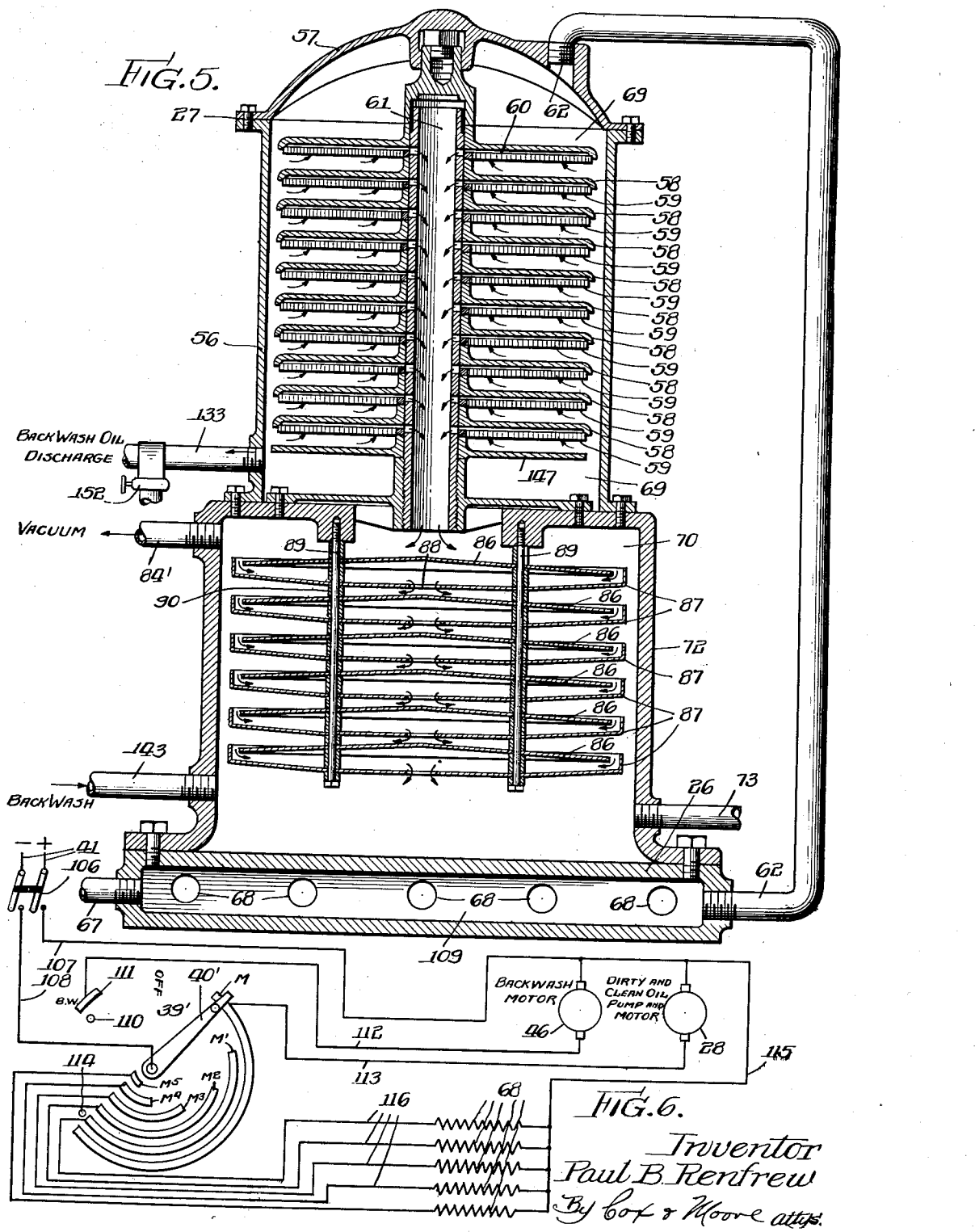

2,062,933

UNITED STATES PATENT OFFICE 2,062,933

PROCESS OF PURIFYING INSULATING AND LUBRICATING OILS

Paul B. Renfrew, Fort Wayne, Ind., assignor to S. F. Bowser & Company, Inc., Fort Wayne, Ind., a corporation of Indiana Original application January 11, 1930, Serial No. 420,062. Divided and this application May 18, 1934, Serial No. 726,347

1 Claim. (Cl. 196—16)

My invention relates to a process or method for removing impurities from insulating and lubricating oils to restore the efficiency thereof, particularly removing solid impurities and water from oils used for electrical insulating purposes. My improved methods, however, may have a general application.

This application is a division of my co-pending application, Serial No. 420,062, filed January 11, 1930 and which has matured into Patent No. 1,962,463. In the present application I am claiming my improved purifying method. In my copending case I am claiming one novel apparatus by which the method may be carried out.

It is an object of my invention to provide a method for rendering anhydrous various types of oils including oils for heating and lubricating purposes wherein the oils are subjected to a particular treatment, including the utilization of positive pressure, the utilization of approximately specific temperatures, and the utilization of a vacuum closely approaching an absolute vacuum.

Another object of the invention is the provision of an improved system or method for conditioning a filter adapted to remove impurities from liquids.

A further object of the invention is an improved system and method for controlling a flow of liquid through a filter in a circulating system having as its source of supply used liquid to be purified.

Another object of the invention is the provision of an improved system and method for controlling the back wash of a filter and directing the back wash liquid out of the system.

An additional object of the invention is the provision of an improved system and method for draining a filter by directing the liquid out of the system.

Another object of the invention is the provision of a system and method for purifying oil embodying provisions for replenishing the system with liquid from an outside source.

Other objects of the invention will appear hereinafter, the novel features and inventions being set forth in the appended claim.

Although my novel method of purification is not limited for use with the specific apparatus hereinafter to be described, and could be carried out in various ways, one preferred and novel apparatus and means for carrying out the method which I use for illustration is set forth in the accompanying drawings in which Fig. 1 is a diagrammatic view showing the relation of the various parts of a suitable apparatus setup for carrying out the method of my invention. This view represents the parts as the filter is being conditioned.

Fig. 4 is a diagrammatic view similar to Fig. 1, but showing the relation of the parts and connections for effecting draining of the filter to a tank outside of the circulating system.

Fig. 5 is a sectional elevation of the filter shown in Figs. 1 to 4 inclusive.

Fig. 6 is a wiring diagram of the electrical circuits and connections of the apparatus shown in Figs. 1 to 4, inclusive, diagrammatically.

My method consists generally in the purification of oils such as insulating or lubricating oils by forcing them at high pressure through small orifices to remove solid impurities and suspended matter, heating the oil to a desired temperature and, through the utilization of a definite high vacuum, removing the water therefrom. The method includes the filtering operation, the conditioning of the filter to perform such operation, the backwashing of the filter for cleaning and the draining of parts of the system as more particularly pointed out hereinafter. It also includes the replenishing of the liquid supply in various ways as will appear.

Figure 1:
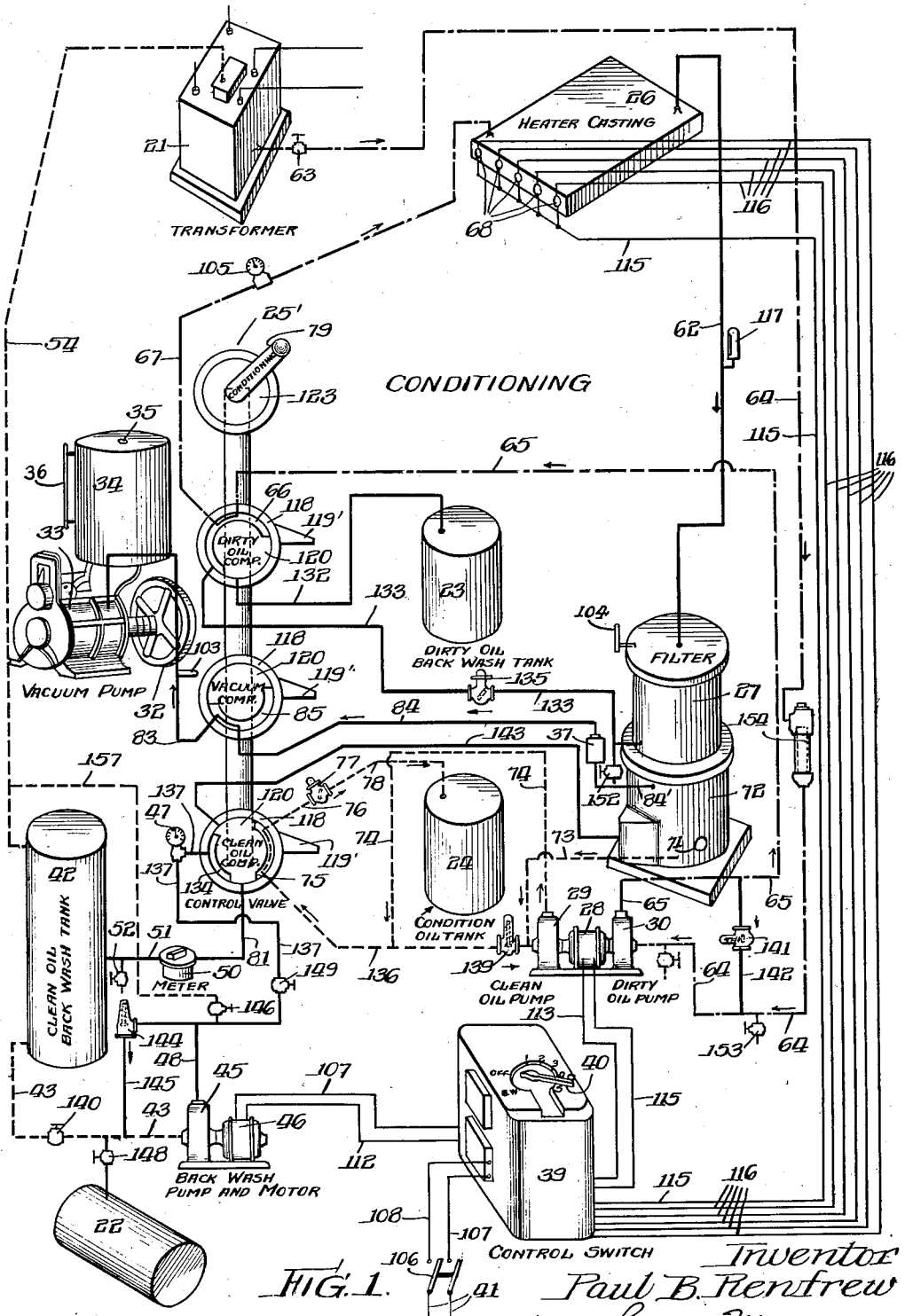

Reference is now made to the drawings in which, as stated, one suitable and preferred apparatus arrangement is shown for carrying out the method and processes of my invention. The various parts shown in Fig. 1, for example, except the transformer 21, the barrel tank 22, the dirty oil backwash tank 23 and the conditioning oil tank 24, may be mounted upon a readily transportable platform or carrier truck so as to be portable to the place where the liquid, such as the insulating oil of transformers, or the insulating oil of electric switches, is to be treated to have the traces of moisture removed therefrom, as well as solid impurities. The valve structure shown at 25', in Figs. 1 to 4 inclusive, is illustrated therein diagrammatically for convenience. It is to be understood, however, that in practice the various valve parts 123 and 120, would be constructed as a unit for simultaneous movement by the control handle 79. Also, for sake of clearness, the heater element 26 for heating the filter 27 is shown separated therefrom in Figs. 1 to 4 inclusive; but, in practice, the heater element would be located in the base or under the filter 27, as shown in Fig. 5. The electric motor 28 and the vacuum pump 33 are also shown separated in the drawings for convenience but, in practice, the motor 28 for driving the clean oil pump 29 and the dirty oil pump 30, as shown in Fig. 1, for example, would be provided with a pulley on its shaft for driving a belt running on wheel 32, connected to the vacuum pump 33 for driving the latter. Mounted on the vacuum pump 33 is an oil seal tank 34 vented to the atmosphere at 35. The tank 34 is provided with a sight gauge 36.

An oil trap of suitable construction for preventing the removal of oil from the filter 27 into the vacuum pump is shown at 37 in Figs. 1 to 4 inclusive. Also shown in these figures is controller 39 for controlling by means of its operating lever 40 the heater elements and motors which are supplied with electric current from the supply means 41, as diagrammatically illustrated in Fig. 6.

A clean oil backwash tank is indicated at 42 and the bottom of this tank is connected by means of the pipe 43 directly to the backwash pump 45, which is connected to the electric motor 46 for operation thereby. A suitable pressure gauge 47 may be connected to the pipe 48 leading from the discharge side of the backwash pump 45.

After the oil is filtered it passes through the pipe 81 and then through the meter 50 into the pipe 51 which directs the filtered oil into the tank 42. When the valve 52 of Fig. 1 is closed the oil will flow upwardly through the pipe 54 after the tank 42 becomes filled. The oil is thus directed into the top of the transformer 21. The member 50 may be of the displacement type such as that shown in the Hosmer L. Blum Patent No. 1,423,597, granted July 25, 1922, for an Improvement in meters.

The filter 27 is shown in sectional elevation in Fig. 5 and is similar to that disclosed in my copending application Serial No. 302,743, filed August 29, 1928, for Apparatus for employing vacuum on porous laminated filtering mechanism. This filter comprises a cylinder 56 surmounted by a cap 57 supplied with mechanism on its lower central side for clamping together the multiple filter comprising a plurality of units each having a disc-shaped holder 58 with a disc filter element 59 mounted on the under side thereof to leave a chamber 60 for the flow of the filtered oil into the pipe 61 as indicated by the arrows. The oil to be filtered enters through the pipe 62 and can pass into the pipe 61 only through the plurality of filter elements 59, each of which is composed of very compactly wound filter ribbon having thereon spaced-apart cross-bars to afford spaced-apart grooves between the entrance sides and the discharge sides of the filter elements 59. These grooves form minute passageways of capillary proportions and microscopic dimensions because the ribbons are only four one-thousandths of an inch in thickness, the grooves being only four ten-thousandths of an inch in depth and each one-eighth of an inch in width with the raised cross-bars or cross-ribs a little wider. When such a ribbon three-eighths of an inch in width is wound very compactly into a disc it forms a filter element with minute pores distributed uniformly over the faces of the disc.

Figure 2:
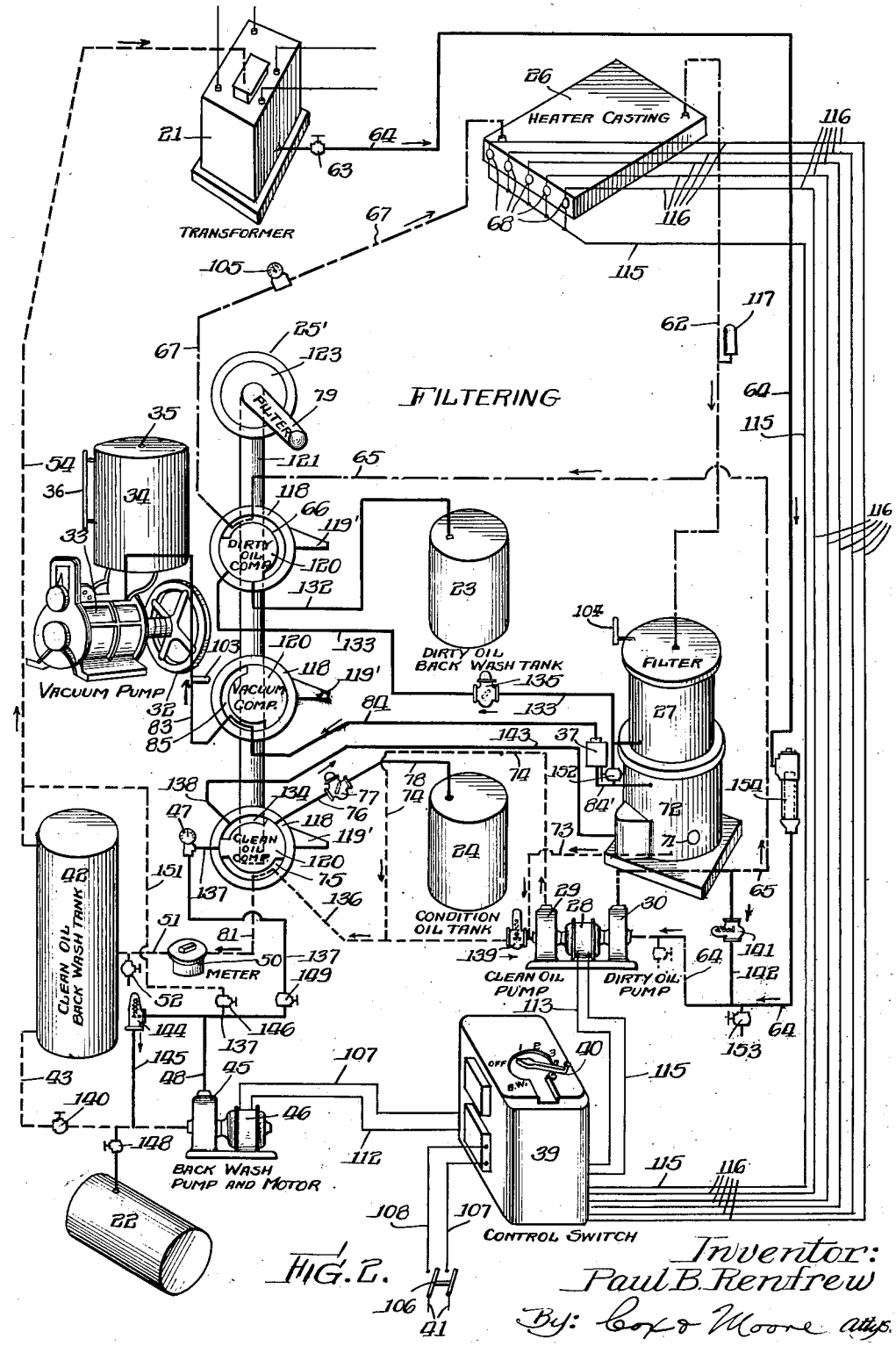
Fig. 2 is a diagrammatic view similar to Fig. 1, but showing the relation of the parts and the connections when the filter is operating.

When the dirty oil pump 30 is operated by the motor 28 and the valve 63 of Fig. 2 is open, used oil from the transformer 21 will be pumped through the pipe 64, through the pump 30 into the pipe 65, and thence through a valve port 66 into the pipe 67 which is connected to the heater casting 26.

As shown at the bottom of Fig. 5, the heater casting 26 may be in the form of a closed casing for permitting the electric heater coils 68 to be embedded in the oil which flows into the casing or heater casting 26 from the pipe 67. The oil flows out of the casing 26 through the pipe 62 and through the cover 57 into the chamber 69 in which the multiple filter is located.

It will thus be seen that the dirty oil pump 30 pumps the used oil from the transformer 21 or the used oil from some other container and after passing it through the heater delivers it to the dirty oil pressure chamber 69. The dirty oil pump 30 and its piping connections should be such as to be capable of raising the hydraulic pressure up to approximately one-hundred pounds per square inch on the entrance sides of the filter elements 59. The porous filter elements 59 remove all carbon, dirt, sludge, and sedimentary deposits from the oil to insure thorough filtration of the solid particles of impurities in the oil.

In using the apparatus for treatment of insulating oil or used oil of a transformer it may not always be necessary to condition the filter 27, but when treating switch oils it is desirable to build cakes of sediment on the under entrance or pressure sides of the porous filter elements 59, to insure complete filtration of all suspended carbon particles and foreign matter present in such oils. Conditioning of the filter 27 is effected by pumping with the dirty oil pump 30 the used oil through the multiple filter for a sufficient length of time to build up the necessary cakes of filtered material on the bottoms of the filter elements 59. The extent to which the desirable cakes are being formed may be determined by the appearance of the filtered oil in the chamber 70 into which the filtered oil is discharged from the pipe 61 as shown in Fig. 5. A sight-glass window may be provided at 71 in the bottom of the casing 72 as shown in Fig. 1. When the oil becomes clear it is an indication that sufficient caking has been effected on the bottoms of the filter elements 59.

The arrangement of the parts and the connections for effecting conditioning of the filter are shown in Fig. 1. The clean oil pump 29 is used during the conditioning operation to pump the oil from the bottom of the casing 72 through the pipe 73. The pump discharges this oil through the pipe 74 and thence through the port 75 of the valve 25' into the pipe 76. This pipe is provided with a check-valve 77 which opens when the clean oil pump 29 builds up sufficient pressure. The oil then flows through the pipe 78 into the condition oil tank 24. The used oil during the conditioning operation is not sufficiently filtered and for that reason is discharged into a separate tank or container 24 and later re-filtered.

After the conditioning operation has been performed the control valve lever 79 may be immediately moved to the position shown in Fig. 2 for establishing connections for permitting the flow to continually circulate from the transformer through the filter and back to the transformer. During the operation of filtering, the motor 28 is driving both of the pumps 29 and 30. The valve 63 being open, the dirty oil pump 30 pumps the used oil from the transformer 21 through the pipe 64 and the filter screen 154 into and through the pump 30 to the pipe 65. The oil flows through the port 66 of the valve 25' into the pipe 67 and thence through the heater casting 26, and from the latter into the pipe 62 which is connected to the filter chamber 69 as shown in Fig. 5. The clean oil pump 29 draws the purified oil from the bottom of the casing 72 into the pipe 73 and after passing through the pump 29 the oil is forced through the pipe 74 into the port 75 of the valve structure 25'. The oil then passes through the pipe 81 into the meter 50 and thence through the pipe 51 into the clean oil backwash tank 42. The valve 140 of tank 42 being closed, the pump 29 will be able to force the oil from the tank 42 into the pipe 54 and thence back to the transformer 21.

Both during the conditioning operation and during the filtering operation the valve structure 25' permits the application of a vacuum by means of the vacuum pump 33 to the vacuum chamber 70 shown in Fig. 5. The vaccum pump 33 is connected by means of the pipe 83 to the pipe 84 through the port 85 of the valve structure 25' and the pipe 84' is connected to the upper portion of the casing 72 as shown in Fig. 5. Figs. 1 and 2 illustrating respectively the conditioning operation and the filtering operation show that the port 85 connects the pipes 83 and 84 during both of these operations.

The vacuum effected by the vacuum pump 33 is applied directly to the chamber 60 on the upper or discharge sides of the filter elements 59. As the oil exudes through the multiplicity of pores it forms a thin film on the upper face of each filter element 59 so that the applied vacuum will immediately cause vaporization of the minute traces of water or moisture in the oil. When the flow of the oil through the filter elements is taking place comparatively rapidly on account of being connected to the oil casing of a transformer, the caking of solid impurities on the bottoms of the filter elements may not be sufficient to slow down the flow. Insulating oil for transformers has very little solid impurities, but it is very important to remove the minute traces of water or moisture from such insulating oil in order to restore the dielectric efficiency thereof. By slightly increasing the cross-sectional area of the pores in the filter elements the rate of flow of the oil may be increased and I therefore desire to add under such conditions the spreaders comprising the cones 86 in combination with the circular pans 87 having openings 88 at the centers of their bottoms as shown in Fig. 5. While the device shown in Fig. 5 of the drawings has been referred to in the present specification as a filter, it will be appreciated that by providing a device having a purality of relatively small openings or pores through which the oil may be forced under relatively high pressure, I have provided a most efficient device for rendering the oil anhydrous. This device for rendering the oil anhydrous is particularly effective due to the fact that the oil forced through the pores or openings under high pressures becomes very finely sub-divided, atomized or broken up, and in such state is subjected to a vacuum which preferably approaches very closely to a perfect vacuum, and furthermore, the removal of water or moisture from the gases is particularly enhanced by heating the oil to temperatures below any temperatures which will tend to harm the oil. By thus heating the oil and subjecting it to a relatively high vacuum, I am enabled to use such relatively low temperatures as will cause the practically instant removal of water from the oil under the influence of the vacuum. It will thus be seen that my invention is of twofold aspect: First, the treatment of the oil by forcing it under pressure through small pores or openings to filter the oil and/or by forcing the oil under high pressure through small openings while subjecting the discharge end of the opening to a relatively high vacuum, and while heating the oil to temperatures below oil carbonization temperatures whereby to render the oil anhydrous. The cones 86 and the pans 87 alternately arranged as shown in Fig. 5 are supported by means of the rods 89 and the spacers 90 which are suspended from the under side of the top of the casing 72. The filtered oil descends from the pipe 61 as indicated by the arrows and flows radially outwardly on the upper surfaces of the cones 86 and radially inwardly on the pans 87, thus spreading the oil over a large area in a small space and affording ample opportunity for the last traces of moisture that may be in the oil after leaving the chamber 60 to escape by additional vaporization, through the pipe 84', into the oil trap or seal 37 shown in Fig. 2 and thence to the pipe 84, valve 25, pipe 83, vacuum pump 33 and the oil drip tank 34 to the atmosphere through the vent 35.

The oil seal 37 is connected in the vacuum pipe. It may be connected as shown in Fig. 2 between the pipes 84 and 84'. The construction of one suitable form of oil seal is disclosed in my aforementioned co-pending application, Serial No. 420,062. However, any suitable liquid separating trap, various types of which are well known in the art, may be used.

When the vacuum pump is operating and a vacuum is being applied to the chamber 70 through the pipe 84', any oil which passes through the pipe 84 either as a liquid or in the form of a mist will be stopped by the oil trap. It will thus be seen that the oil trap is provided in connection with the vacuum chamber of the filtering apparatus and that this oil trap is connected directly in the vacuum line. The purpose of this oil trap is to prevent possibility of any oil, either liquid or in the form of a mist, passing to the vacuum pump. If this should occur the vacuum pump may become flooded and the efficiency of it lowered considerably.

The function of the vacuum pump is the removal of moisture from the insulating oil. The vacuum pump lowers the atmospheric pressure on the filtered oil to a point where the moisture in the oil boils violently. This causes the moisture to expand approximately sixteen-hundred volumes into its vapor phase, thereby enabling it to be separated entirely from the oil. This permits the entrapped moisture to be readily removed from the oil by vacuum treatment leaving it in a completely anhydrous condition. The application of the vacuum makes it unnecessary to heat the oil up to a temperature of 212 degrees Fahrenheit which is necessary to boil water at atmospheric pressure. As hereinafter explained, the electric heaters keep the temperature at from 140° to 160° Fahrenheit which is sufficient to assure maximum speed in dehydrating and enabling the vacuum to operate at its highest degree of efficiency.

The vacuum pump after removing the liberated water from the vacuum chamber expels it to the atmosphere by condensing it back to water in the oil seal tank 34. The condensed water may be periodically removed from the oil seal tank 34 by the open siphon method.

A closed manometer 103 is placed in the vacuum line by being connected to the pipe 83, Fig. 2. This manometer is located between the control valve 25' and the vacuum pump to indicate the degree of vacuum under which the equipment is operating. The degree of vacuum found desirable is within ten to twenty millimeters of a perfect vacuum.

The tank 34 which is mounted on the vacuum pump is partly filled with oil and serves as a constant vacuum seal. The level of oil in the oil seal tank for efficient operation of the vacuum pump may be indicated in connection with the glass gauge 36. That is to say, the efficient operation of the vacuum pump may be predetermined and the depth indicated on the tank for efficient operation and by means of the glass gauge the oil in the tank 34 may be brought to the proper depth for such efficient operation.

An air release valve 104 may be connected to the top of the filter 27 so as to communicate with the chamber 69. This air release valve 104 may be similar to the ordinary air release on a steam radiator and when this valve is open the used oil to be filtered may flow into the chamber 69 until all of the entrapped air has passed through the air release valve 104 which may be indicated by the flow of oil from the air release 104, upon which this release is closed and kept closed during the operation of the apparatus.

Figure 3:
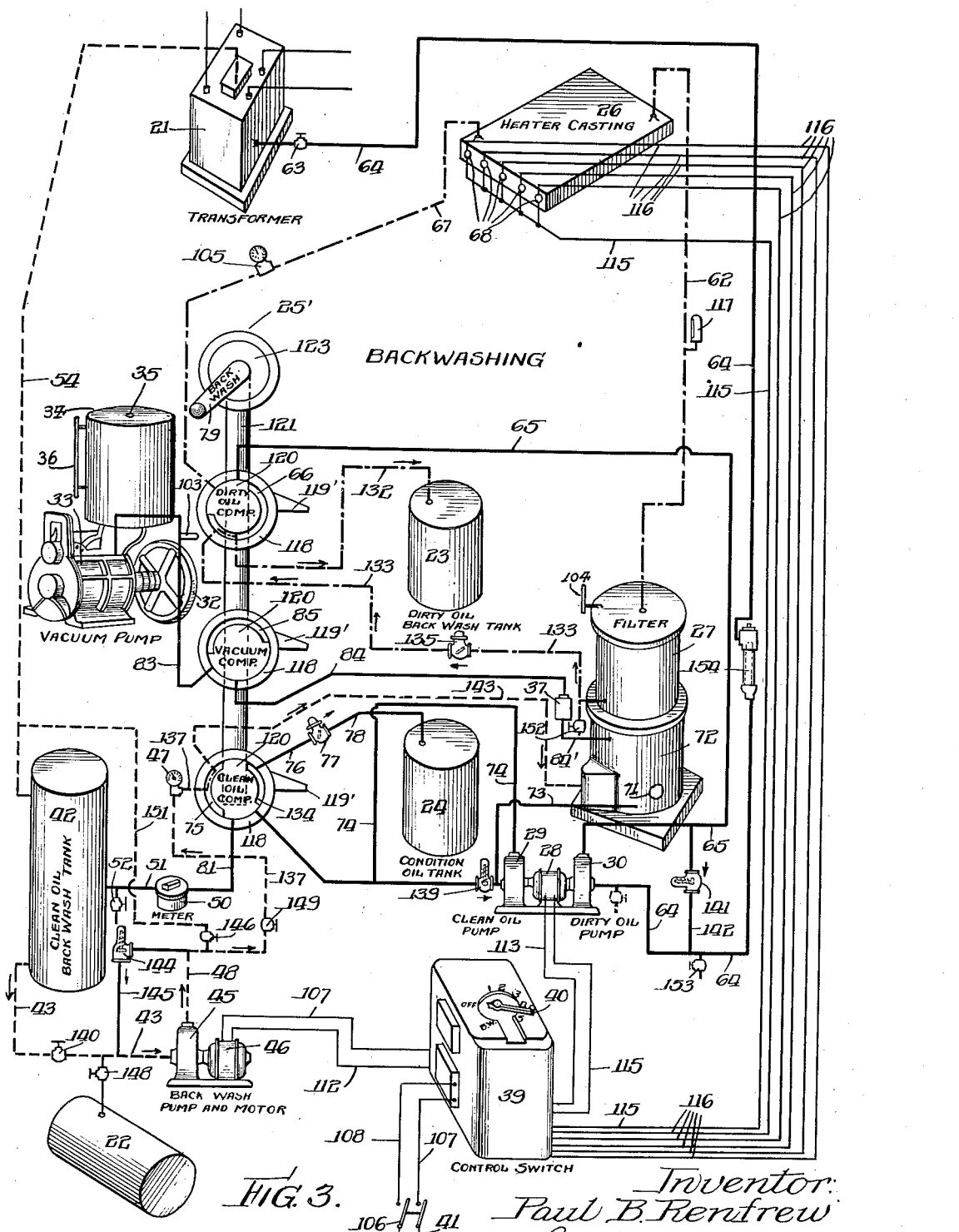
Fig. 3 is a diagrammatic view similar to Fig. 1, but showing the relation of the parts and connections when the filter is being cleaned by back-washing.

A two-hundred and fifty pound pressure gauge 105 is connected to the dirty oil discharge line. This pressure gauge may be connected to the pipe 67 between the control valve 25' and the filter 27 as shown in Fig. 2 to indicate the pressure under which the system is operating during the purifying process. Another pressure gauge 47 which may also be a two-hundred and fifty pound pressure gauge is located in the discharge line of the backwash pump 45, to indicate the backwash pressure as shown in Fig. 3.

Since transformers are often located in outside positions exposed to atmospheric conditions the temperature of the oil therein will vary at different seasons of the year and therefore it is desirable to provide a plurality of heating elements 68, any one or more of which may be connected in circuit so as to vary the temperature of the inflowing used oil. In Fig. 6 is shown a wiring diagram of the circuits and connections for the electric heater elements 68 and also for the electric motors 28 and 46. The controller 39 of Fig. 1 is diagrammatically illustrated at 39' in Fig. 6 by means of a switch lever 40' operating on switch contacts which are all in the same plane, although it should be understood that the controller 39 shown in Fig. 1 may be of the type having a vertical shaft and the contacts at different elevations.

When the main line switch 106 of Fig. 6 is closed the supply mains 41 will be connected to the conductors 107 and 108. When the switch lever 40' is in a vertical position or "off" position the circuit will remain open, but when the switch lever 40' is moved in an anti-clockwise direction into engagement with the stop or abutment 110, it will be electrically connected with the switch contact 111 and thereby close the electric circuit through the conductor 107, backwash motor 46, conductor 112, switch contact 111, switch lever 40' and conductor 108. This circuit is established between the supply mains 41.

When the switch lever is moved to its full line position shown in Fig. 6 it will engage the semi-circular contact M and close the circuit through the conductor 107, motor 28, conductor 113, contact M, switch lever 40' and conductor 108. It will thus be seen that when the dirty oil and clean oil motor 28 is operating no circuit can be established to the backwash motor, and when the backwash motor is operated the current is cut off from the dirty oil and clean oil motor 28. Furthermore, when the switch lever 40' is in its full line position shown in Fig. 6 none of the heater elements 68 are as yet connected in circuit and therefore the dirty oil and clean oil motor 28 may operate the dirty oil pump and clean oil pump independently of the operation of the heater elements. Therefore during hot weather or when the transformer oil has already been sufficiently heated during operation the heater elements may be kept out of circuit.

When desired, particularly in connection with the treatment of insulating oil for switches, the switch lever 40' may be moved into contact with the arcuate contacts $M^1$, $M^2$, $M^3$, $M^4$ and $M^5$ successively until the switch lever 40' abuts against the stop 114. The stop 114 compels the switch lever 40' to be moved in an anti-clockwise direction when it is desired to operate the backwash motor 46. When the switch lever 40' is on any one or more of the contacts $M^1$ to $M^5$ it always remains in engagement with the semi-circular contact M. Consequently whenever any of the heating elements are operated the dirty oil and clean oil motor 28 is also operated. When more than one heating element 68 is connected in circuit the current flows through the same in multiple from the conductor 115 to the conductors 116. It should be understood that the heater casting 26 is entirely closed so that when the oil enters from the pipe 67 it completely submerges the heating elements 68. The oil to be filtered is circulated through the heater casting 26 completely submerging all of the heaters 68 and the oil is therefore subjected to the maximum amount of heat created by each of the heater elements 68.

As shown in Figs. 1 and 5, the oil may be heated by the heating elements 68 in the chamber 109 before it flows through the pipe 62 to the chamber 69 of the filter 27. It is preferable by means of the electric heaters to keep the temperature of the oil at 140° to 160° Fahrenheit so as to assure maximum speed in passing through the porous filter elements 59 and in being dehydrated in the chambers 60 and 70. In other words, by heating the oil its viscosity is reduced and its flow increased through the filter elements and, moreover, the higher temperature enables the vacuum to operate at its highest degree of efficiency without necessitating such a high temperature as 212° Fahrenheit which would be necessary at atmospheric pressure to effect vaporization of water.

One electrical switch 39' as shown in Fig. 6, which switch may be in the form of the controller 39 shown in Fig. 1, controls the starting and stopping of all electrical equipment in the entire system. The controller lever 40 is mounted in convenient position for operation and by means of this single lever the dirty oil pump 30 and clean oil pump 29 may be operated by the motor 28 and the backwash pump 45 may be operated by the motor 46 and one or more of the heater elements 68 may be connected in circuit only when motor 28 is in operation. The dirty oil pump 30 and the clean oil pump 29 may be operated with or without the heaters. At no time can the backwash motor 46 be started without first returning the control handle 40 to the "off" position. Seven positions may be designated on the controller top marked respectively "B. W.", "off", 1, 2, 3, 4 and 5, as illustrated in Fig. 1. As the temperature rises one or more of the heating units can be disconnected to obtain the desired temperature and thereby use a minimum number of heating units.

A thermometer 117 may be mounted in the flow line of the pipe 62 and by means of this thermometer the temperature of the oil may be observed so that it may be regulated by means of the electric heater and the switch mechanism for controlling the same. By having the single controller connected as shown in Fig. 6, a one-point electrical control for the entire system illustrated in Fig. 1 is afforded.

The multiple valve shown diagrammatically at 25' in Figs. 1, 2, 3 and 4 has a single operating lever 79 and thus affords a one-point control for the conditioning, filtering, backwashing and draining operations. The control valve 25' of the system consolidates and combines the manipulation of many valves into a single unit having only four operating positions which may be designated "filter", "backwash", "drain" and "condition". This multiple valve is simple in construction but positive in operation. It is so designed that regardless of the direction of the flow of the oil, whether clean oil or dirty oil, each kind of oil is confined to a separate compartment in the valve body so that the clean oil is never contaminated by the dirty oil. The vacuum compartment in the valve body is placed between the clean oil compartment and the dirty oil compartment to assist in preventing contamination, and the valve compartments are so arranged that the vacuum compartment will be sealed from the atmosphere.

The specific construction of the multiple valve 25' is set forth in detail in my aforementioned co-pending application Serial No. 420,062. However, inasmuch as the specific details of construction are not material to my new process or method it is not believed necessary to set forth the details of construction of the valve herein. Suffice to say that the valve is provided with annular recesses as indicated diagrammatically in Figs. 1, 2, 3 and 4, which form the several fluid passageways in the valve body. The several recesses are separated one from the other, as has been stated, but all are cut from a single valve body 120, movement of which is controlled by operating lever 79 so that all the valve passageways are simultaneously controlled by the single operating lever. The recess 66, the recess 85, and the two recesses 75 and 134, may be separated by being displaced vertically along the valve body 120, the two recesses 75 and 134, however, being in the same plane. Recess 66 is the dirty oil compartment, recess 85 is the vacuum compartment, and recesses 75 and 134 constitute the clean oil compartments. As previously indicated, the vacuum compartment lies vertically between the dirty oil and clean oil compartments and thus aids in separating them so as to prevent oil contamination. Dirty oil compartment 66 cooperates with pipes 65, 67, 132 and 133; vacuum compartment 85 cooperates with pipes 84 and 83; clean oil compartments 134 and 75 cooperate with pipes 76, 136, 81, 137 and 143, in the various positions of the valve body, all as indicated in Figs. 1, 2, 3 and 4.

Pipe 132 is connected to the dirty oil backwash tank 23, and pipe 133 is connected to the lower part of the case 56 of the filter, as shown in Fig. 5. A check valve 135 is located in the pipe 133 to permit the flow of backwash oil from the chamber 69 of the filter toward the tank 23. Pipes 83 and 84 are in the vacuum line, as illustrated in Fig. 1.

When the valve 25' is in "filtering" position illustrated in Fig. 2, the port 75 at the lower end of the valve 120 connects the pipes 136 and 81. The pipe 136 is connected to the pipe 74. When the valve 25' is in the position illustrated in Fig. 2 and the motor 28 operates the clean oil pump 29, oil may be drawn from the chamber 70 to the pipe 73 and the pump 29 discharges the oil into the pipe 74 and thence into the pipe 136. A loaded valve 139 is connected in a by-pass between the suction and discharge ports of the clean oil pump 29 so that when the back pressure or head in the pipe 136 exceeds a predetermined limit the oil will be directed through the valve 139 back to the pump 29. The oil pumped into the pipe 136 passes through the port 75 into the pipe 81 and thence through the meter 50 into the pipe 51 and the closed tank 42. The valve 140 being closed the oil will pass through the clean oil backwash tank 42 into the pipe 54 and thence to the transformer 21.

At the same time that clean oil is being taken from the chamber 70 and pumped to the transformer 21, used oil is being taken from the transformer and pumped by means of the dirty oil pump 30 into the pipe 65. A loaded valve 141 in the by-pass pipe 142 permits return of the oil to the suction side of the pump 30 if the head in the pipe 65 exceeds a predetermined limit. The pipe 65 directs the oil through the port 66 of the control valve 25' into the pipe 67 and thence through the heater casting 26 into the pipe 62 and thence into the filter chamber 69 as shown in Fig. 5.

Also, at the same time that oil is being circulated in the system illustrated in Fig. 2 by being drawn from the transformer simultaneously with the supply of oil to the transformer, the vacuum pump 33 is being operated, the port 85 of the valve 120 establishing communication between the closed chamber 70 and the vacuum pump 33 through the oil trap 37 and into the oil seal tank 34. Since the pulley 32 on the shaft of the vacuum pump 33 is connected by a belt to the shaft of the motor 28 the vacuum pump will be operated at the same time that the clean oil pump 29 and the dirty oil pump 30 are being driven.

Since the clean oil pump 29 and the dirty oil pump 30 are provided with by-passes with loaded valve 139 and 141 therein respectively each set at about one-hundred pounds, the pumps cannot be stalled and consequently the motor 28 will continue to drive the vacuum pump 33 at all times during the operations of "conditioning" and "filtering" illustrated respectively in Figs. 1 and 2. A single motor 28 may therefore be used to drive the vacuum pump 33, as well as the clean oil pump 29 and the dirty oil pump 30.

The operation of the system illustrated in Fig. 1 for the purpose of "conditioning" the filter shown in Fig. 5 will be best understood by following the steps in the positioning of the switch lever 40' of Fig. 6 and the position of the valve operating lever 79 of the valve structure diagrammatically illustrated at 25' in Fig. 1. With the switch lever 40' in position M—1, 2, 3, 4, 5, depending upon the amount of electric heat required, the operating valve lever 79 is moved to the "condition" position. This position is diagrammatically illustrated in Fig. 1. With the main line switch 106 closed and the switch lever 40' in position to start the motor 28 and throw into circuit one or more of the heating elements 68, the clean oil pump 29 and the dirty oil pump 30 and also the vacuum pump 33 will be operated. The port 75 at the lower end of the valve 120 will establish communication between the pipe 136 and the pipes 76 and 78 through the check-valve 77 to the condition oil tank 24. The check-valve 77 opens from the pipe 76 to the pipe 78 but will prevent return flow. Used oil is pumped by the dirty oil pump 30 through the port 66 and the heater 26 to the filter 27 while the filtered oil is pumped by the clean oil pump 29 through the port 75 to the tank 24. At the same time the port 85 is in the vacuum line and vacuum is being applied to the filtered oil. However, in order to bring the filter into proper condition for efficient filtration, the oil is pumped through the filter into the tank 24 until sufficient caking of the solid particles occurs on the bottoms of the filter elements 59 to result in very efficient filtration. By observing the oil at the bottom of the casing 72 through the sight-glass window 71 the progress of the caking may be determined by the condition of the oil. When it becomes clear it is an indication that sufficient caking has taken place.

The used oil that is used for the "conditioning" operation is stored in the condition oil tank 24 and later refiltered. After the conditioning operation has been effected the control valve lever 79 may be moved through 90° to its "filter" position illustrated in Fig. 2. In the filter position of the valve structure the communication to the pipes 132 and 133 is cut off and also the communication to the pipes 76 and 137. In other words, the pipes 132, 133, 76 and 137 are closed at the valve casing by the valve 120.

After the conditioning operation has been performed by the formation of cakes of impurities on the bottoms of the filter elements 59, the pressure exerted by the dirty oil pump on the liquid in the chamber 39 is about one-hundred pounds per square inch.

The rapidity with which the thickness of the cake on the bottom of each filter element 59 increases depends upon the amount of foreign matter in the oil. In the treatment of insulating oil of transformers the increase of the cakes is very slow because of the very small quantity of solid particles of impurities in the transformer oil, but when the filtering system is used for treatment of switch oils the cakes increase in thickness more rapidly and ultimately the capacity of the multiple filter shown in Fig. 5 is materially reduced and the cakes must be removed by backwashing. A two-hundred and fifty pound pressure gauge is located in the dirty oil discharge line as indicated at 105 in Fig. 2 and by observation of this pressure gauge it may readily be determined when backwashing is necessary or advisable in such a circulating system as that illustrated in Fig. 2 wherein used oil is being continually taken from the transformer 21, purified and sent back to the transformer. When it is desired to increase the pressure on the oil in the chamber 69 the loaded valve 141 may be adjusted for such increased pressure. For instance, if the caking increases the pressure may be increased by increasing the load on the valve 141 and the resulting pressure will be indicated on the pressure gauge 105. When the pressure has been increased to two-hundred pounds per square inch the efficiency has been materially decreased and backwashing is then advisable.

To effect backwashing the switch lever 40' of Fig. 6 is brought back to "off" position. The operating lever 79 is then moved 90° from "filter" position to "backwash" position. The positions of the valve ports when the lever 79 is moved to backwashing position are illustrated in Fig. 3. As shown in Figs. 3 and 5, when the valve structure 25' is in backwashing position the port 75 at the lower end of the valve 120 establishes communication between the pipes 137 and 143, the latter being connected to the lower portion of the clean oil chamber 70. The pipe 137 is connected to the pipe 48 which leads to the discharge side of the backwash pump 45. The suction side of the pump 45 is connected by means of the pipe 43 to the bottom of the clean oil backwash tank 42.

The two-hundred and fifty pound pressure gauge 47 is connected to the pipe 137 as shown in Fig. 3 and a loaded valve 144 is located in a by-pass 145 around the backwash pump 45. When the backwash pump pressure exceeds a predetermined limit the valve 144 permits the oil to flow back to the suction side of the pump through the by-pass 145, thereby preventing the pump from stalling. The backwash pressure may be varied by adjusting the loaded valve 144.

In order to effect operation of the backwash pump 45 the switch lever 40' is moved from its "off" position into engagement with the contact 111 against the stop 110 shown in Fig. 6. A circuit will then be established between the conductors 107 and 108 through the backwash motor 46. Clean oil will then be pumped from the clean oil backwash tank 42 through the pipe 43 when the valves 140 and 149 are open and valves 148 and 146 are closed. The clean oil will be discharged into the pipes 48 and 137 when the valve 146 is closed. The oil then passes through the port 75 of the valve 120 into the pipe 143 and thence into the chamber 70 and up through the pipe 61 shown in Fig. 5 into the chambers 60 and downwardly through the pores of the filter elements 59 to force the cakes of impurities therefrom by hydraulic pressure. This backwashing operation is preferably performed at a pressure of two-hundred pounds per square inch on the upper surfaces of the filter elements 59.

This backwashing operation dislodges the cakes of sediment quickly and removes a portion of it from the chamber 69 of the filter 27 by the flow of the mixture of oil and impurities through the pipe 133. The flow of oil at this time through the pipe 62 is blocked or shut off by the closure of the pipes 65 and 67 at the upper end of the valve 120 as shown in Fig. 3.

The port 66 at the upper end of the valve 120, however, establishes communication between the pipes 133 and 132 so that the mixture of impurities from the cakes and the oil may be directed into the dirty oil backwash tank 23. The remaining large particles of impurities which are removed by the backwashing pressure from the bottoms of the filter elements 59 are received on the tops of the cup-shaped holders 58 and the disc 147. The impurities on the tops of the holders 58 and the disc 147 are removed to the bottom of the chamber 69 by the washing operation and may then be removed from the casing 56 periodically through a handhole provided at the bottom of the casing 56.

Inasmuch as the backwashing pressure is to be exerted so that the flow of oil mixed with impurities shall be only through the pipe 133 to the dirty oil backwash tank 23, the vacuum pipe line is also closed at the valve 120 between the pipes 83 and 84. By referring to Fig. 3 it will be seen that the pipes 83 and 84 are closed at the valve 120 since the port 85 is located distant from the pipes 83 and 84 when the lever 79 is in backwashing position. Therefore, exit from the chamber 70 is cut off except through the pipe 61 and the chambers 60 at the tops of the filter elements 58 and exit from the chamber 69 is cut off except through the pipe 133 which leads through the port 66 to the pipe 132 and thence to the dirty oil backwash tank 23. It will also be seen that when the switch lever 40' is in backwashing position the motor 28 is cut off from the source of electric supply and therefore the clean oil pump 29 and the dirty oil pump 30 are not operating during the backwashing period.

The backwashing pump is capable of creating a pressure of two-hundred pounds per square inch which is sufficient to fully restore the original capacity of the system, and this backwashing pressure is always available. When this backwashing operation is applied to the filtering apparatus it quickly and completely removes the cakes of impurities which have been formed during the filtration process.

Besides observing the pressure being exerted on the filtering apparatus as indicated by the pressure gauge 105, the rapidity with which the oil is being filtered may also be checked by observing the number of gallons of oil passing through the meter 50. In other words, by means of the meter 50 the rate of flow through the system may be observed at any time and thereby determination may be made as to when it is necessary to backwash to regain the rated capacity of the system.

After the backwash operation has taken place the filter chamber 70, the pipe 61 and the chambers 60 are left full of clean oil which should not be wasted. Therefore in the next operation the valve control lever 79 is moved to "drain" position. The connections of the system for draining are illustrated diagrammatically in Fig. 4. The switch lever 40' having first been moved to "off" position when the backwash pump is stopped, is now moved to the position shown in full lines in Fig. 6 after the lever 79 has been moved to "drain" position illustrated in Fig. 4. The switch lever 40' may be at M or M—1, 2, 3, 4 or 5. The driving of the motor 28 will operate the clean oil pump 29 and the dirty oil pump 30 but the pipe 65 being closed by the valve 120 the dirty oil pump 30 will merely operate through the by-pass valve 141. The clean oil pump 29, however, will pump the oil in the chamber 70 through the pipe 73 and discharge it through the pipes 74 and 136 and thence through the port 134 into the pipe 81 and through the meter 50 into the pipe 51 and then into the clean oil backwash tank 42. The vacuum line at this time will be closed by the valve 120 closing the pipes 83 and 84. After the oil has been sufficiently drained from the chamber 70 to bring the level of the oil below the lowermost pan 87 the system may be operated to effect filtration for insulation oil or the filtering mechanism may be reconditioned for the purification of switch oils.

The filter screen 154 may be an enclosed casing with a cup-shaped screen therein to prevent coarse particles of material from entering the pump 30. The valve 153 is normally closed, but when opened, a sample of oil may be taken from the transformer to test its dielectric strength. The valve 152 may be used to drain the dirty oil from filter 27 when the latter is inoperative and backwashing becomes necessary.

Means are also provided for transferring oil from one receptacle to another such as barrel to barrel, or barrel to underground tank. The control valve 25' may be set in any position desired while the apparatus is operated for transferring oil or other liquid from one receptacle to another. The controller 39 is, however, set in backwashing position. That is to say, the switch lever 40' of Fig. 6 is moved against the stop 110 so as to engage the contact 111 and thereby close the circuit through the backwash motor 46 between the conductors 107 and 108.

If now the valves 140 and 149 are closed with the valves 148 and 146 open, oil may be pumped from the barrel or tank 22 and transferred through the pipes 48 and 151 into the pipe 54 and thence into the transformer 21. Due to the fact that there are no valves in the pipe line 54 between the transformer 21 and the clean oil backwash tank 42, oil may be pumped from the barrel or tank 22 into said clean oil backwash tank 42. It should be understood that the oil in the tank 22 should be purified oil in condition for use in the transformer 21, but if there should be any moisture therein it will be removed in the circulating system of purification. The oil that is introduced into the top of the transformer casing 21 is taken out from the bottom thereof through the pipe 64 when the valve 63 is open and the dirty oil pump 30 is operated with the control valve in the position indicated at 25' in Fig. 1.

When desired, the tank 42 may be drained into barrels 22 by opening the valves 140 and 148 when the barrel is connected, as shown in Fig. 3. A connection to an outside barrel or tank may also be made at 52 in which event the operating lever 79 of the control valve may be set in "drain" position as shown in Fig. 4 and the switch lever 40' moved onto contact M so as to operate the motor 28. In this manner clean purified oil may be withdrawn from the chamber 70 shown in Fig. 5 through the clean oil pipe 73 and delivered to the container connected to valve 52.

In order to transfer oil or other liquid from one tank to another both located outside of the unit; this may be done by operating the backwash pump 45 while the control valve is in any of the four operating positions with the valves 148 and 146 open and the valves 140 and 149 closed. One barrel may be connected to the pipe 43 through the valve 148 and the other barrel 42 connected to the pipe 137 through the valve 146. This may be seen by referring to Fig. 3. When the backwash pump 45 is operated the liquid may be withdrawn from the tank 22 and pumped through the pipes 43 and 48 and through the valve 146 to the other barrel. By closing the valve 148 and disconnecting the barrel 22, the valve 140 may be opened and by operating the backwash pump 45 clean oil may be withdrawn from the tank 42 and directed through the valve 146 to a separate barrel or container. When oil is being transferred from the barrel 22 or from the tank 42 to a separate container connected to the valve in the pipe 137 the valve 149 should be kept closed.

At no time should oil in condition oil tank 24 and dirty oil tank 23 be pumped direct into top of transformer 21, as this oil may not be either filtered or dehydrated. Pipe 64 can be connected to condition oil tank 24 and this oil filtered in the regular way as this oil is dehydrated in the conditioning process but not completely filtered of suspended carbon particles. In the same manner oil in the dirty backwash tank 23 may be allowed to stand to remove the coarser particles of impurities by sedimentation and then the oil in the upper part of the tank 23 may be filtered in the regular way.

If transformer casing is to be filled with oil before the same is started into operation, this may be done by using the backwash pump 45 to pump oil from barrel 22 through the pipes 43, 48, 151 and 54 while the valves 148 and 146 are open and the valves 140 and 149 are closed. After a transformer is operated for some time the filtering unit may be connected thereto to effect the filtering operation illustrated in Fig. 2. Prior to such treatment the filter may be conditioned.

Fig. 1 shows the equipment and connections for conditioning of the filter. Upon operating the controller 39 to start the motor 28 the dirty oil pump 30 will be driven and so also the clean oil pump 29 to effect circulation of the oil while the parts are connected as illustrated in Fig. 1. The oil used during the conditioning of the filter 27 is pumped into the condition oil tank 24. After the filter 27 is conditioned this oil may be introduced into the transformer 21 by setting the valve apparatus illustrated at 25' in Fig. 2 in filtering position and also in such position as to connect the dirty oil suction line 140 to the condition oil tank 24. After the oil in the condition oil tank 24 has been filtered and delivered to the transformer 21, the latter is connected to the pipe 64 by opening the valve 63, whereupon the oil in the transformer 21 will be continued to be filtered as illustrated in Fig. 2.

If there is not sufficient oil in the system at such time to completely fill the tank 42 and maintain proper depth of the oil in the transformer casing 21, more oil may be introduced into the system by means of the backwash pump pumping oil from a separate tank 22 into the transformer casing 21 until after continued filtering operations the tank 42 is completely filled and the proper depth of oil maintained in the casing 21. It should be particularly noted that the purified oil is introduced into the transformer casing 21 as fast as the used oil is being withdrawn therefrom so that the system is entirely automatic while the proper depth of oil is maintained in the transformer to completely submerge the parts which it is intended to insulate.

Obviously those skilled in the art may make various changes in the various process steps and methods hereinbefore described, or could make various changes in the details and arrangements of the apparatus disclosed, or could substitute other apparatus than that specifically described for carrying out the several methods without departing from the spirit and scope of the invention as defined by the claim hereto appended. I wish therefore not to be restricted to the precise illustrative embodiment herein disclosed but only as indicated in the following claim.

I claim:

The herein described process which consists in forcing oil under pressure of approximately 100 pounds per square inch through a plurality of relatively minute orifices, distributing the liquid over relatively large areas while subjecting the same to a relatively high vacuum and thereafter drawing the filtered oil from said surfaces and returning it to its source of use in a continuous cycle.

PAUL B. RENFREW.